United States Patent Office 3,300,381
Patented Jan. 24, 1967

3,300,381
METHOD OF EFFECTING DIURETIC THERAPY
David A. McClure, Canoga Park, Calif., assignor to Rexall Drug and Chemical Company, Los Angeles, Calif., a corporation of Delaware
No Drawing. Filed Jan. 28, 1964, Ser. No. 340,824
4 Claims. (Cl. 167—65)

This invention relates to a method of effecting diuretic therapy in mammals.

The invention sought to be patented is described as residing in the concept of administering to mammals an effective dose of an N-substituted 1,3-diketo-4,9-o-benzeno-benz[f]perhydroisoindole, or a salt thereof as hereinafter defined, of the formula

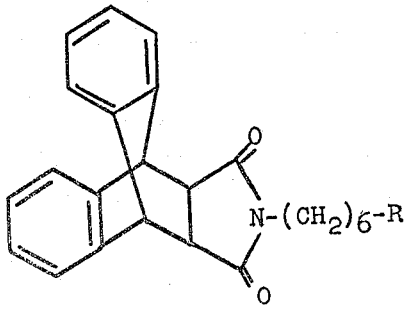

wherein R is di-lower alkylamino or its hereinafter disclosed equivalents.

As used throughout the specification and in the claims the term "lower alkyl" embraces straight and branched chain alkyl radicals containing one to six carbon atoms.

The manner and process of making and using the invention will now be generally described so as to enable one skilled in the art to make and use the same as follows:

The compounds which are administered in accordance with the method of this invention are prepared according to the procedure described in J. Am. Chem. Soc. 82:4436 (1960) employing the following reaction sequence:

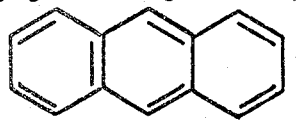

+

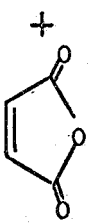

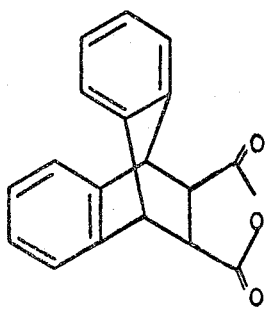

Starting material

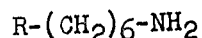

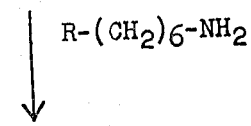

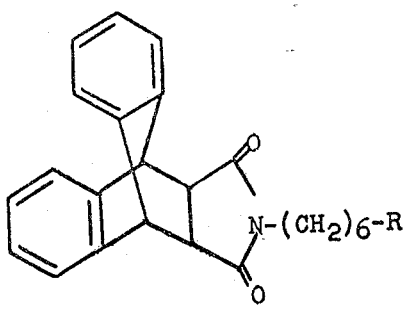

Final product wherein R is di-lower alkylamino or its hereinafter described equivalents.

In the reaction sequence depicted hereinabove the anhydride starting material, from which is prepared the compound to be administered in accordance with the method of the present invention, is prepared by the reaction of anthracene with maleic acid anhydride in an inert solvent such as methylene chloride with the aid of a catalyst such as aluminum chloride.

The anhydride thus formed is treated with an appropriate diamine, such as, for example, dimethylaminohexylamine, at elevated temperature, usually without a solvent. At the conclusion of the reaction, the mixture is poured into an inert solvent such as petroleum ether and the product is then recovered therefrom by conventional crystallization techniques.

Diamine reactants of the formula R—$(CH_2)_6$—$NH_2$ wherein R is a heterocyclic ring linked to the alkylene chain through a nitrogen atom or lower alkyl substituted derivatives thereof, for example, piperidino, pyrrolidino, morpholino, piperazino, 2-methylmorpholino, 3-ethyl piperidino, 2-methyl piperazino and the like, are the full equivalents of the di-lower alkylamino-n-hexylamine depicted in the foregoing reaction sequence and their use in the process above described yields final products which have the same utility as N-(6'-di-lower alkylaminohexyl)-1,3-diketo-4,9-o-benzeno-benz[f]perhydroisoindoles in the method of this invention.

The compounds thus prepared are utilizable in the method of this invention either as their free bases or in the form of a non-toxic pharmaceutically acceptable acid addition or quaternary ammonium salt thereof. Such salts are readily prepared by conventional procedures. Typical acid addition salts include the hydrochloride, hydrobromide, citrate, maleate, sulfate, nitrate and the like. Typical quaternary ammonium salts are those formed with such alkyl halides as methyl iodide, ethyl bromide, n-hexyl bromide and the like. Such salts are the full equivalents of the free bases and are included within the scope of the invention.

In accordance with the method of this invention, the N-substituted-1,3-diketo - 4,9-o-benzeno-benz[f]perhydroisoindoles, either as free bases or in the form of their non-toxic pharmaceutically acceptable acid addition or quaternary ammonium salts, are administered to mammals for the purpose of effecting diuretic therapy. For the purposes of such administration, the compounds are desirably combined with standard diluents and carriers to provide such various conventional dosage forms as tablets, capsules, solutions, suspensions, suppositories and the like. Inasmuch as the N-substituted-1,3-diketo-4,9-o- benzeno-benz[f]perhydroisoindoles described hereinabove have been found to possess an effective degree of diuretic activity when administered to mammals orally, the oral route of administration is generally to be preferred due to the ease of administration and patient acceptance. However, all routes of administration normally practised in the art of administration of drugs to mammals may be employed in addition to the oral route, including, for example, such parenteral routes as the intravenous, intramuscular and intraperitoneal routes of administration.

The present invention resides in the method of administering to mammals an effective dose of an N-substituted - 1,3 - diketo-4,9-o-benzeno-benz[f]perhydroisoindole as described above for purposes of diuretic therapy. It will be within the skill of the individual practitioner administering the drug to determine the proper dosage schedule. Such dosage will be determined not only by the severity of the condition requiring diuretic therapy, but in addition, upon the age of the subject and the route of administration selected. The term "effective dose" as used herein means the dose as determined by the one administering the drug based upon his professional judgment in the light of the foregoing factors.

The best mode contemplated by the inventor for carrying out the present invention will now be set forth as follows:

EXAMPLE 1

*N-(6'-dimethylaminohexyl)-1,3-diketo-4,9-o-benzeno-benz[f]perhydroisoindole*

(a) *1,2,3,4-tetrahydro-1,4-o-benzo - naphthalene-2,3-dicarboxylic anhydride.*—Technical grade anthracene (500 g., 2.8 mole) is mixed with methylene chloride (6 liters), aluminum chloride (375 g., 2.8 mole) and maleic anhydride (275 g., 2.8 mole). The resulting reaction mixture is stirred at room temperature for 30 minutes and is then decomposed by pouring it onto excess ice, followed by extraction with methylene chloride. The organic layer is dried over anhydrous magnesium sulfate treated with Norit-A and then reduced in volume until white crystals appear. Petroleum ether (30°–60° C. boiling point) is added to complete crystallization. The yield is 219 grams (29%) of crystals, M.P. 258° C.

(b) *N-(6'-dimethylaminohexyl)-1,3 - diketo-4,9-o-benzeno-benz[f]perhydroisoindole.*—The anhydride (19.15 g., 0.0694 mole), prepared as described in step (a) above, is mixed with 6-dimethylaminohexylamine (10 g., 0.0694 mole) and heated in an oil bath at 180° C. for 2 hours. The melt which forms is then poured into petroleum ether and crystallization is induced by scratching. The product is recrystallized from methylene chloride-petroleum ether to yield 22 g. (79%) of white crystalline solid, M.P. 129°–130° C.

*Analysis.*—Calculated for $C_{26}H_{30}N_2O_2$ (M.W. 402.52): C, 77.58%; H, 7.51%; N, 6.96%. Found: C, 77.21%; H, 7.57%; N, 6.76%.

EXAMPLE 2

*Evaluation of N-(6'-dimethylaminohexyl)-1,3-diketo - 4,9-o-benzeno-benz[f]perhydroisoindole as a diuretic agent in mammals*

Acute toxicity determinations in mice, in accordance with standard pharmacological test procedures, reveal that N-(6'-dimethylaminohexyl)-1,3-diketo-4,9 - o - benzeno-benz[f]perhydroisoindole has an intraperitoneal $LD_{50}$ of 351 mg./kg. and an oral $LD_{50}$ of 780 mg./kg. These data reveal that the compound is well absorbed from the gastrointestinal tract.

The diuretic activity of N-(6'-dimethylaminohexyl)-1,3-diketo - 4,9-o-benzeno-benz[f]-perhydroisoindole was evaluated in a study wherein its diuretic properties were compared with those of an established, commercially available diuretic preparation, 5-acetamido-1,3,4-thiadiazole-2-sulfonamide (acetazolamide).

Under the conditions of the test 36 rats of approximately 180 to 220 grams body weight were separated into three groups of 12 animals each. The first group of animals was regarded as untreated controls and the animals were each given, by intubation, 1.0 cc. of water. The second group of animals was treated with the standard diuretic acetazolamide at its dose of optimum effectiveness, 100 mg./kg.; also by intubation in 1.0 cc. of water. The third group of animals was treated with N-(6'-dimethylaminohexyl)-1,3-diketo-4,9-o-benzeno - benz[f]perhydroisoindole, prepared as described in Example 1, at a dose of 175 mg./kg., in 1.0 cc. of an aqueous suspension, by intubation.

All of the animals were placed in metabolism cages, two animals to a cage, and the cumulative urinary output was measured at 5 and 24 hours after the drugs were administered.

The results are summarized as follows:

CUMULATIVE TOTAL URINARY OUTPUT PER ANIMAL 5 AND 24 HOURS AFTER MEDICATION

| Group | 5 hrs. | 24 hrs. |
|---|---|---|
| Untreated control | 1.4 cc. | 4.5 cc. |
| Compound of Ex. 1 | 6.6 cc. | 13.3 cc. |

By comparison, acetazolamide at its dose of optimum effectiveness promoted a cumulative urinary output per animal of 7.6 cc. at the end of 5 hours and 10.6 cc. at the end of 24 hours. These data indicate that the compound, N - (6' - dimethylaminohexyl) - 1,3-diketo-4,9-o-benzeno-benz[f]perhydroisoindole, promotes a degree of diuresis in mammals which is comparable to that promoted by the standard diuretic acetazolamide at the end of 5 hours following administration and of superior quality at the end of 24 hours after administration.

The subject matter which the applicant regards as his invention is particularly pointed out and distinctly claimed as follows:

What is claimed is:

1. A method of effecting diuretic therapy in mammals which comprises administering to a mammal an effective dose of N-(6'-di-lower alkylaminohexyl)-1,3-diketo-4,9-o-benzeno-benz[f]perhydroisoindole.

2. A method of effecting diuretic therapy in mammals which comprises administering to a mammal an effective dose of N-(6'-dimethylaminohexyl)-1,3-diketo-4,9-o-benzeno-benz[f]perhydroisoindole.

3. A method according to claim 2 wherein the route of administration is oral.

4. A method according to claim 2 wherein the route of administration is parenteral.

References Cited by the Examiner

FOREIGN PATENTS 876,686    1960    Great Britain.

OTHER REFERENCES

Yates et al.: Journal of the American Chemical Society, volume 82, pp. 4436–4437 (1960).

JULIAN S. LEVITT, *Primary Examiner.*

SAM ROSEN, *Examiner.*

LEROY B. RANDALL, *Assistant Examiner.*